US012486700B2

(12) United States Patent
Hyppa

(10) Patent No.: US 12,486,700 B2
(45) Date of Patent: Dec. 2, 2025

(54) GATE BLOCK METHOD AND HARDWARE

(71) Applicant: Richard G Hyppa, Tracy, CA (US)

(72) Inventor: Richard G Hyppa, Tracy, CA (US)

( * ) Notice: Subject to any disclaimer, the term of this patent is extended or adjusted under 35 U.S.C. 154(b) by 98 days.

(21) Appl. No.: 18/611,795

(22) Filed: Mar. 21, 2024

(65) Prior Publication Data

US 2024/0328219 A1 Oct. 3, 2024

Related U.S. Application Data

(60) Provisional application No. 63/455,946, filed on Mar. 30, 2023.

(51) Int. Cl.
*E05C 17/54* (2006.01)
*E05C 17/00* (2006.01)

(52) U.S. Cl.
CPC ............ *E05C 17/54* (2013.01); *E05C 17/025* (2013.01)

(58) Field of Classification Search
CPC ................................ E05C 17/54; E05C 17/025
See application file for complete search history.

(56) References Cited

U.S. PATENT DOCUMENTS

| | | | | |
|---|---|---|---|---|
| 9,127,489 | B2 * | 9/2015 | Orlov | E05C 17/54 |
| 10,094,158 | B2 * | 10/2018 | McRoskey | E05F 5/06 |
| 10,626,644 | B2 * | 4/2020 | Ching | E05C 19/184 |
| 10,876,330 | B1 * | 12/2020 | Anderson | E05C 17/025 |
| 10,883,297 | B1 * | 1/2021 | Seise | E05F 5/06 |
| 11,118,382 | B2 * | 9/2021 | File | E05C 17/025 |
| 12,252,913 | B2 * | 3/2025 | Zeppetelli | E05C 17/54 |
| 2014/0182341 | A1 * | 7/2014 | Orlov | E05C 19/182 70/14 |
| 2014/0225385 | A1 * | 8/2014 | Millsap | E05C 17/025 292/288 |
| 2016/0145914 | A1 * | 5/2016 | Fuentes | E05C 17/56 16/82 |
| 2017/0226782 | A1 * | 8/2017 | Holden | E05C 17/54 |
| 2018/0128025 | A1 * | 5/2018 | Estrada | E05C 17/56 |
| 2023/0140013 | A1 * | 5/2023 | Reichbach | E05C 17/025 16/82 |

* cited by examiner

*Primary Examiner* — Mark A Williams
(74) *Attorney, Agent, or Firm* — Donald Debelak

(57) ABSTRACT

A method when a spring loaded, or non-spring loaded gate is opened, a wood block is placed into the right angled space created between the vertically hinged open gate's end piece which is attached to the fence or other structure to which the gate is attached end piece, the block held in place by a smooth bolt on a connecting tool, which is held in the block with a curved cupped features that extend from the connecting tool, and inserted with a friction fit into a receiving cavity of a receiving tool, consisting of a receiving cavity on one end and curved cupped features that extend outward from the receiving tool, which is installed on the end piece of the fence or other structures on which the rotating piece of the hinge is connected, the two part hardware fastening device comprises a receiving tool and a connecting tool.

5 Claims, 4 Drawing Sheets

GATE BLOCK METHOD AND HARDWARE

FIELD OF THE INVENTION

The present invention relates to keeping a gate open when desired.

BACKGROUND

The present invention relates to an improved method which is expressly designed to keep a horizontally swingable door in a set open position by using a wood block with a connection tool set in the wood block and a receiving tool set in the fence end section holding the rotating hinge parts. The receiving tool is placement is aligned to position the wood block so it is held tightly in the right angled space between the end of the gate that is attached to a fence or other structure with a hinged mechanism, and the end piece of the of the fence or other structure that the gate is attached to and as a result holding the gate open when the user desires the gate to stay opened.

It is realized, of course, that the art to which the invention relates invokes the adoption and use of all sorts of chocks, so-called door stops and checks and anchors. It is also customary practice when someone desires to keep the gate open to find wedge blocks, chisels, screwdrivers and the like shoved between the bottom of the door and the floor or between the gate and the structure to which the gate is attached. These tactics may work for a time but are unstable and may cause damage to the gate or the structure holding the gate. The obvious object of the this invention is to structurally, functionally and otherwise improve upon similarly constructed and performing door stops and anchors and, in so doing, to provide a construction in which manufacturers, home owners, carpenters, painters and others will find meet their respective requirements and needs.

Briefly summarized, the inventive method has to do with the combination of a vertically hinged gate having a lower edge swingable in a horizontal plane above the surface of a horizontal ground or parallel to ground surface, the wood block interposed in the right angled area between the open gate's end piece, and the fence or other structure's end piece holding the gate. A key component of this method is the connecting tools, which uses a "friction fit" rather than a threaded connection to hold the block in place. This fastening device can be used to connect a wide variety of wood pieces in a wide variety of applications.

Novelty is also predicated on a two-part connecting hardware which allows a wood block to be easily connected to the vertical end structure of the fence structure holding the gate in the right angled space between a gate and a structure holding the gate and wherein after the method is employed he gate will stay open as long as desired.

SUMMARY OF THE INVENTION

Gates are attached to a fence or other structure with a pivoting component that is attached to the fence or other structure, while the other end swings open. The method of this invention offers a quick way of holding the gate open by placing a placing a wood block in the angled space (typically close to 90 degrees) between the end of the gate and the end of the structure to which the gate end is attached when the gate is closed. The method consists of utilizing a block of wood with connecting hardware consisting of two parts, a connecting tools with one end a smooth bolt, and the other end with curved cup features that extend outward from the tool, that fasten into the wood block, and a receiving tools which has one end a receiving cavity, and on other end curved cupped features and is installed on the end piece of the fence or other structure.

The connecting tool is comprised on one end of a smooth bolt, and the other end curved cupped features that extend outward from the connecting tool. which is forced into the wood block. The receiving tool's receiving cavity, which is slightly larger than the fastening bolt to allow a friction fit may have many shapes, but the cavity for receiving the bolt, is shaped like the bolt and is just larger than the bolt, and on the other end also has a curved cupped features that extend out ward from the receiving tool and that end is then forced into the wood or other material of the fence or other structure.

The method is comprised of:

Installing a connecting mechanism comprising a smooth bolt end with collar away from the end of the smooth bolt on one end and circular cupped devices on the opposite end of the attachment mechanism from the smooth bolt end is placed into a wood block, with the smooth bolt end of the attachment mechanism extending outward from the wood block, while the collar lies flush against the wood block;

locate a installation point on an end support plate of a fence or other structure when the structures holding the pivoting portion of the hinge are installed, where the block with the smooth bolt end of the attachment mechanism when inserted into a receiving cavity of the receiving tool at this installation point will allow the block to be in contact with a gate end when the gate is in an open position;

with the gate open, install into the installation point a receiving tool comprising a receiving cavity with collar on one end and circular cupped devices on the opposite end of the receiving tool from the receiving cavity into end support piece of a fence where the rotating elements of a hinge are installed, with receiving cavity and collar flush with the surface of the end support piece of the fence, or if no end support piece is present, with the end of the fence itself;

with the force required by a friction fit, push the smooth bolt end of the attachment mechanism into the receiving cavity;

The two-part fastening device which consists of a connecting tool with a smooth bolt on one end, with the other end curved cupped features that extend outward from the tool, the connecting tool being installed in the wood block, and a receiving tool with a receiving cavity on one end and curved cupped features that extend outward from the receiving tool. The positioning bolt and positioning housing can be used in many applications other than the with the gate block. What makes the fastening device unique is its use of a "friction fit" rather than a threaded or other more permanent connection, allowing the fastener to be quickly applied and released.

Alternative Embodiments

The curved cupped features could be replaced with barbs.

The curved cupped features could be rotated into the wood block and the end of the fence support piece, rather than pushed in.

Prior Patents

There are numerous gate stop patents, but primarily with a device between the floor and the gate or through the use swing arm bars, which can hold the gate in various positions. Here are some of the patents that appear to be most relevant.

U.S. Pat. No. 2,703,728 Raber "The present invention relates to an improved structural device or means which is expressly designed and effectually usable in retaining a horizontally swingable door in a set position by anchoring the lower edge portion of the door to a conventional horizontal floor surface U.S. Pat. No. 3,996,642, Atkins "An apparatus to vary the degree which a door may be opened and held in place. An operating arm of the door holder is mounted with to a slide which is mounted within a slide channel. Holding means is a slide at a fixed position within the slide channel. The other end of the operating arm is mounted with a pivot to an adjustable bracket."

U.S. Pat. No. 4,181,337, Mueller "A door holding apparatus holds a door in a preselected position relative to a door support. The apparatus includes a rod which has a first end pivotally connected to the door and a second end for engaging the door or door support. Force exerting apparatus exerts a force against the rod and urges the rod into forcible engagement with the door or door support."

U.S. Pat. No. 4,194,264, Stoffregen. A releasable latch, for attachment to a door check unit having a cylinder and a piston, and serving to secure a door in an open position with a release. A lever can freely slide along the rod of the piston and can be tilted on the rod for releasable locking engagement. A cam and follower are moveable from a pre-set position to tilt the lever into locking engagement when the door is opened beyond a predetermined limit and then released. On release of the lever from locking engagement with the piston rod the cam and follower are returned to their pre-set position.

U.S. Pat. No. 4,837,890, Perry. "A door closer is disclosed having an operating arm with a track traveler which mounts a plurality of rollers. The rollers engage between them the opposite sides of a track on the door. The opposite sides of the track each have outward concave faces. The rollers are ball-shaped, conforming to the faces of the track. A door holder is also disclosed which may be adjustably fixed at a position along the track, the traveler and the holder having the mating parts of a snap fastener which, when engaged, hold the door at a fixed hold-open position."

Prior patents deal with threaded type connectors, either designed for a stop hold, or a threaded hold, but none deal with a smooth unthreaded bolt on the fitting housing and bolt, and none with a smooth surface receiving housing and none with a friction fit.

CA2952129, Bergman, Concealed structural post fastening device and method. "A post fastening device for mounting a post to a construction surface, the device comprising a base having a planar top surface and a threaded rod extending from the top surface, a tubular member for insertion into a longitudinal axial bore on the bottom end of the post, the tubular member having an upper end and a lower end with internal threads complementary to the threads of the rod, and a dowel rod for insertion into a transverse bore extending through a portion of the post and the tubular member when the tubular member is in the longitudinal bore, the dowel rod being sized to pass through the tubular member and a portion of the post on both sides of the tubular member.

US20100074683, Richard W. Kauppila Joint and method for connecting members end to end. "A joint and method for connecting elongated members end to end in which outer sleeves are anchored in blind holes extending in from each end face and a threaded rod is advanced into threaded nut receptacles affixed to the inside end of each sleeve to draw the end faces into abutment'.

US20160145854, Kawano, Joining structure, "To provide a joining structure that joins at least two or more building members together, in which jig insertion holes into which a joining jig is inserted are provided in the building members, respectively, the joining jig is inserted into the jig insertion holes and an adhesive that fixes the joining jig and the building members together is filled in the jig insertion holes, the joining jig to be inserted into the jig insertion holes includes a cylindrical main body, an intermediate shaft portion, and threaded end portions, and the threaded end portions are provided by rolled threads."

U.S. Pat. No. 5,980,331A, Yasuo Matsushita. "However, if one or more electrical terminals, within cavities in the fitting housing, is not fully inserted into its locked position, the retainer is held in a temporary position wherein a portion thereof projects outwardly of the fitting housing. This portion engages the end face of the receiving housing. The end face is preferably perpendicular to the insertion direction or at an acute angle thereto. As a result, the receiving housing does not distort even if excessive insertion force is applied to the fitting housing and/or the retainer.

None of this prior art uses a similar approach to the wood block approach of this application's method and devices.

REFERENCE NUMBERS ON DRAWINGS

Figure 1:
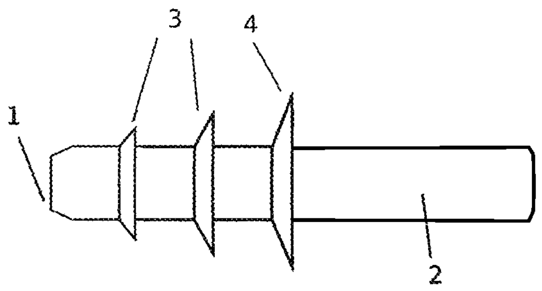
FIG. 1 shows the connecting tool's smooth bolt section on one end, with the collar away from the end of the smooth bolt so it can rest on the wood block with the smooth bolt protruding outward from the block, and the curved cupped features on the other end that extend outward from the receiving tool, all features in a one piece assembly.

1. connecting tool with a smooth connecting bolt on one end and curved cupped features extending from the tool on the other end.
2. smooth bolt end of the attachment mechanism
3. two connecting tool circular cupped devices on one end of the connecting tool for fastening into wood
4. collar for the connecting bolt
5. receiving tool
6. receiving cavity 7. receiving cavity collar
8. two connecting tool circular cupped devices on one end of the connecting tool for fastening into wood.
9. gate
10. wood block
11. part of fence structure, either the fence itself or an end piece attached to the fence, that the gate is attached to.
12. gate hinged mechanism that is installed on to the end support piece of the fence, or the fence itself, and that allows the gate to open
13. fence or other structure that the gate opens away from

DESCRIPTION OF DRAWINGS

FIG. 1 is a side view of the connecting mechanism 1 with an connecting bolt section 2 and connecting tool curved cupped features that extend outward from the connecting tool 3 for fastening into wood and 4 a collar for the attachment bolt of attachment mechanism. Note. The attachment mechanism 1 which carves into, or is pushed into the wood is widely spaced curved cupped turnings, but another fastening device could be attached to the receiving housing.

Figure 2:
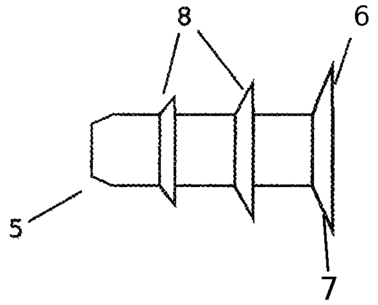
FIG. 2 shows the receiving tool with on end the receiving cavity with collar and the other end with curved cupped features that extend outward, all features in a one-piece assembly.

FIG. 2 is a side view of the receiving tool 5, a collar for the receiving housing that sits flush with the wood block 7, a receiving cavity 8 and the receiving tool's two circular cupped devices on receiving housing for fastening into wood 9. Note that the receiving cavity 8 in the receiving tool 5 is slightly bigger than the smooth un-threaded bolt which allows a friction fit. The receiving tool's curved cupped features that extend outward from the receiving tool 9 which carves into the wood is widely spaced curved cupped features, but another fastening device could be attached to the receiving housing.

Figure 3:
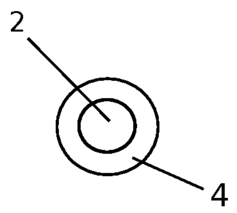
FIG. 3 straight on look at the smooth bolt and the collar on top of the connecting tool, the collar lies further down the bolt than on the end, so it can rest against the block while the smooth bolt protrudes.

FIG. 3 is a straight on look at receiving tool 1, the attachment mechanism's attachment circular cupped features in the wood (hidden), with the smooth bolt section of the attachment mechanism extending away for the wood block 10.

Figure 4:
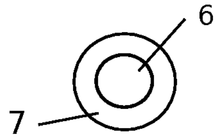
FIG. 4 is a straight on look at the receiving cavity and the collar around the edge of the receiving cavity that rests on the surface of the end structure of the fence.

FIG. 4 is a straight on look at the receiving cavity 6, the receiving collar 7 that holds the piece against the fence structure that attaches to the gate 11, not seen are two receiving tool's circular cupped devices on 9 which are fastened into the fence structure that attaches to the gate 11.

Figure 5:
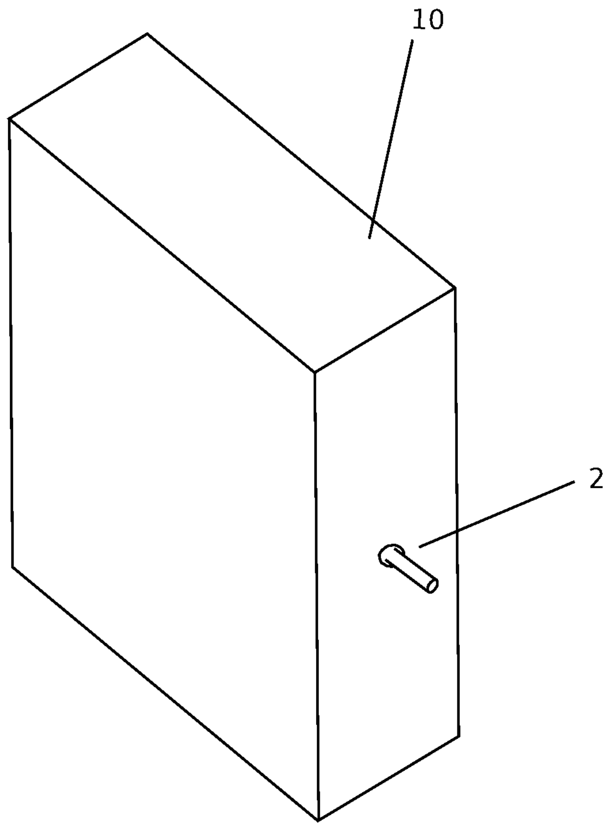
FIG. 5 is a ¾ view of the wood block with the connecting tool's smooth bolt extending from the wood block.

FIG. 5 shows the wood block 10 with the smooth, non-threaded bolt end of the attachment mechanism 2 exiting the block, the collar 4 can also be seen.

Figure 6:
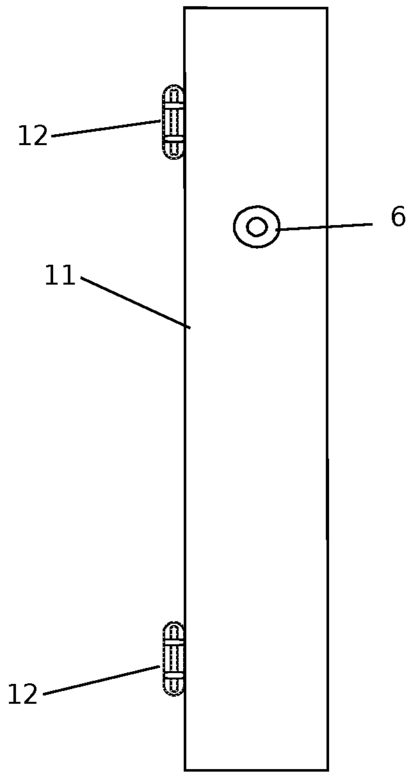
FIG. 6 is a view of the fence's structure, either a fence piece, or an end piece on the fence that the gate is attached to and where the receiving tool with the receiving cavity are installed.

FIG. 6 shows the receiving cavity 6 in the part of the end support piece fence structure 12 that attaches to the gate 9, in part with the hinging section of the hinge 12 which are shown on the figure.

Figure 7:
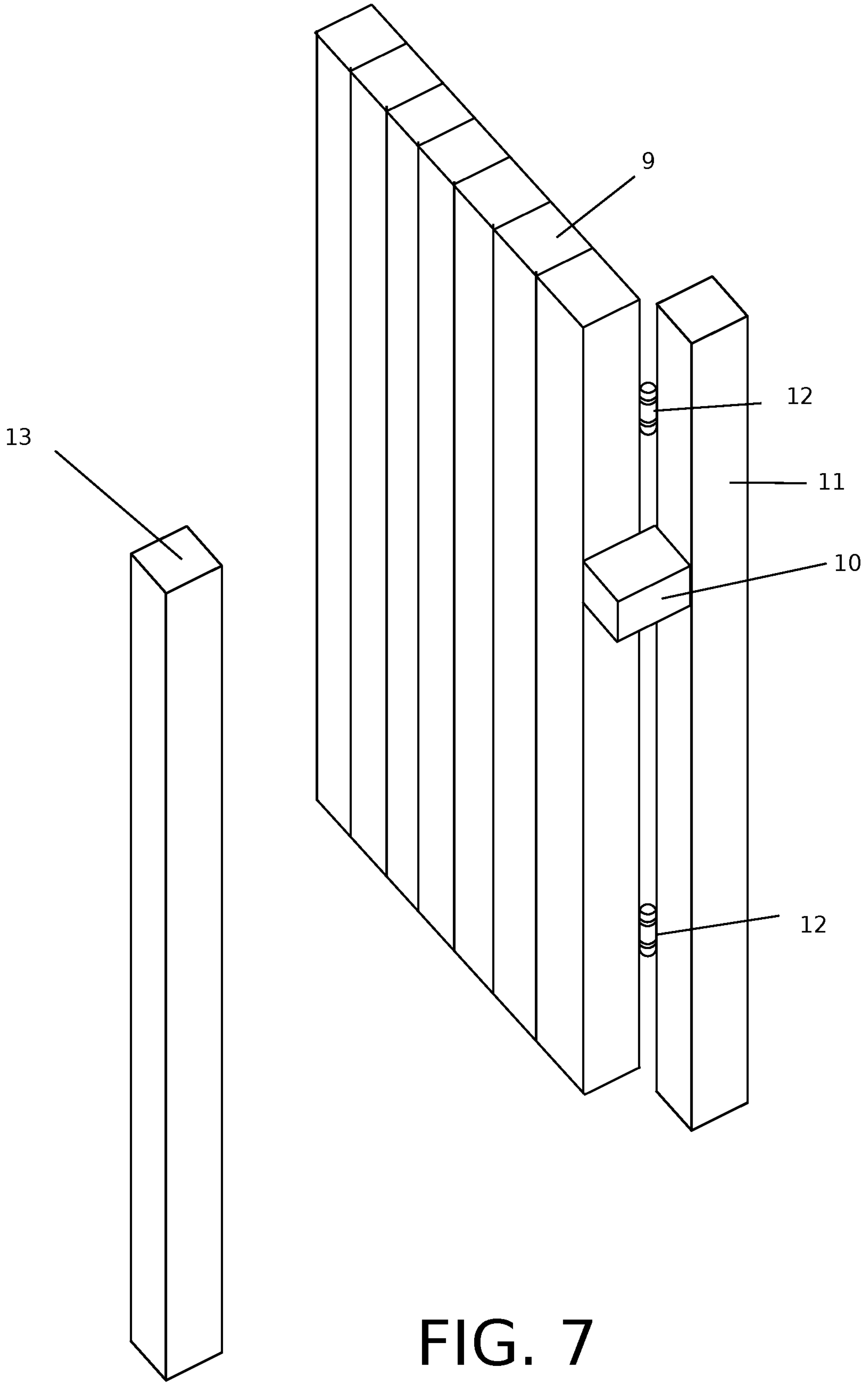
FIG. 7 is a close-up look at the wood block installed into the fence or fence's end piece and positioned to prevent the gate or gate end piece from closing.

FIG. 7 shows the wood block 10 attached to the end support piece of the fence 11, and since it is properly positioned, it is holding the gate 9 at a 90 degree angle, thereby holding the gate 9 open. The gate 9 does not have to be at a 90 degree, but could be at angle close to 90 degrees, 75 degrees to 95 degrees.

I claim:

1. A method for keeping a spring loaded gate open, the method comprising:

installing a connecting tool partway into a wood block, the connecting tool comprising a smooth bolt section that extends outward from the wood block with a connecting tool collar that sits on the wood block where the connecting tool leaves the wood block, on the outside of the connecting tool on the section that remains in the wood block, holding device(s) comprising connecting circular device(s), with an inner edge attached to the outside of the connecting tool and the outer edge curved toward the connecting tool collar wherein the connecting tool requires less effort pushing the connecting tool into the wood block than the effort required pulling the connecting tool out of the wood block;

locating a installation point on an end support plate of a fence or when no support piece is present on the end of the fence, or on the end of another structure, where the installation point is on the same structure that holds the non-pivoting section of a hinge the other part of the hinge installed on the gate, the combination of hinge sections on separate structures allows the gate to swing, at the installation point pushing a receiving tool all the way into the end support plate of the fence, when no support piece is present on the end of the fence, or on the end or on another structure until the collar on the end of the receiving tool sits flush against the an end support plate of a fence or when no support piece is present on the end of the fence, or on the end of another structure, the receiving tool receives the end of the connecting tool smooth bolt section that extends from the wood block into a receiving cavity of the receiving tool, inserting the smooth bolt section of the connecting tool that extends from the wood block into the receiving tool when the gate is open will position the wood block into the roughly 90 angle between open gate and the end support plate of a fence or when no support piece is present on the end of the fence or on the end of another structure, keeping the gate open at a roughly 90 degree angle;

installing into the installation point a receiving tool comprising a receiving cavity, with a receiving tool collar, end with the collar flush with the surface of the end support piece of the fence, or if no end support piece is present with the end of the fence itself, or on the end of another structure and holding pieces, circular device(s), with an inner edge attached to the outside of the receiving tool and the outer edge curved toward the receiving tool collar the receiving tool section that sits within the wood of the an end support plate of a fence or when no support piece is present on the end of the fence, or on the end of another structure wherein the receiving tool requires less effort pushing the receiving tool into the fence plate or other structure end piece than the effort required pulling the receiving tool out of the fence plate or other structure;

with force being required by a friction fit, pushing the smooth bolt end of the connecting tool extending from the wood block, into the receiving cavity of the receiving tool which is installed into the end support plate of a fence or if not end support plate is present into the fence itself or end structure of the fence or into the end of another structure;

wherein the wood block prevents the gate from closing when the connecting tool smooth bolt section is inserted into the receiving tool's receiving cavity, with the gate open, which puts the wood block into the roughly 90 angle of the gate when open and the end support plate of the fence itself or end structure of the fence or into the end of another structure fence or other structure blocking the path of the closing gate;

with force required by a friction fit, pushing the smooth bolt end of the connection tool into the receiving cavity;

wherein the wood block prevents the gate from closing by blocking the path of a when installed closing gate.

2. A two part connecting assembly comprising first a receiving tool with a receiving cavity with the receiving tool collar on one end and the holding circular device(s) with the inner edge attached to the receiving tool and the outer edge curved toward the collar to hold the receiving tool in place and second, a connecting tool which is partially inserted into a wood block with the smooth bolt section extending from the wood block, the smooth bolt section having the connecting tool collar that is flush against the wood block at the point the smooth bolt section leaves the wood block, the section of the connecting tool within the wood block having the holding circular device(s) with the inner edge attached to the receiving tool and the outer edge curved toward the collar.

3. The method of claim 1 where the gate is spring loaded.

4. The method of claim 1 where the wood block is made from other material.

5. The method of claim 1 where the holding circular device(s) are replaced by barbs for holding the connecting tool into the wood block and holding the receiving tool into the stationary end structure of a fence or when no support piece is present on the end of the fence or other structure that holds the non-pivoting section of the hinge.

* * * * *